United States Patent [19]
Magder

[11] 3,944,425
[45] Mar. 16, 1976

[54] FOAMED LIGHTWEIGHT CERAMIC COMPOSITIONS

[75] Inventor: Jules Magder, Princeton, N.J.

[73] Assignee: Princeton Organics, Inc., Princeton, N.J.

[22] Filed: Jan. 31, 1974

[21] Appl. No.: 438,442

[52] U.S. Cl.................. 106/40 R; 106/67; 106/87; 106/90
[51] Int. Cl.² ................... C04B 21/02; C04B 35/16
[58] Field of Search ......... 106/40 R, 67, 87, 90, 86, 106/88

[56] References Cited
UNITED STATES PATENTS

| | | | |
|---|---|---|---|
| 2,081,802 | 5/1937 | Eklund | 106/87 |
| 3,232,772 | 2/1966 | Hilton et al. | 106/40 R |
| 3,729,328 | 4/1973 | Magder | 106/90 |

Primary Examiner—J. Poer
Attorney, Agent, or Firm—Howson and Howson

[57] ABSTRACT

This invention provides cellular clay compositions which are dimensionally stable at 1000°F. and higher, and which have a controlled pore structure that enhances the strength, durability and insulating properties of the compositions.

12 Claims, No Drawings

FOAMED LIGHTWEIGHT CERAMIC COMPOSITIONS

Exemplary of the present lightweight compositions are fired ceramic foam matrices characterized by pores which are essentially spherical in shape, extremely narrow in size distribution, and substantially non-interconnected, which compositions contain anorthite as the crystalline phase present in the largest proportion and which are dimensionally stable at a maximum temperature in the range 2000° to 2550°F.

There are also provided foamed insulating firebrick of the silica-alumina type, containing either mullite or corundum as the crystalline phase present in the largest proportion, and which are dimensionally stable at a maximum temperature in the range 2300° to 3200°F.

Also provided are fired lightweight foamed clay articles useful as structural and semi-structural building materials.

BACKGROUND OF THE INVENTION

Lightweight ceramic compositions which are strong and durable are in great demand for refractory structural and semi-structural applications. Lightweight ceramics are desirable because of their dimensional stability, insulating properties, non-combustibility and inertness to corrosive and abrasive environments.

Ceramics are made in lightweight form by a variety of processes which commonly comprise one of the following steps as the means of inducing porosity:

1. the "burnout" method: the incorporation of combustible or volatilizable particles in a mixture of ceramic raw materials prior to firing;
2. "firebloating" a ceramic material to release a gas such as steam or an oxide of carbon or sulfur;
3. bonding lightweight inorganic particles with a relatively dense cementitious matrix, such as clay- or silica-bonded bubble alumina; or
4. dispersing or dissolving ceramic raw materials in a liquid, foaming the liquid, and then drying and firing the foam. In this method a preformed froth may be mixed with the dispersion or solution: a compressed or condensed gas may be incorporated into the dispersion or solution and allowed to expand; or finally a gas may be generated in the liquid medium by a chemical reaction.

An example of a burnout process is the manufacture of insulating firebrick from a mixture of clay, sawdust, and gypsum. Firebloating processes are used to manufacture lightweight clay masonry or insulation units, foamed glass, expanded perlite, and expanded shale aggregate.

Low density ceramics available commercially have disadvantages such as high cost, poor mechanical strength or difficulty in controlling density. Also, certain standard commercial processes for making lightweight ceramics particularly by the burnout or firebloating methods can discharge major amounts of carbonaceous or sulfur-containing air pollutants.

THE PRIOR ART

Known lightweight clay articles prepared by foaming water dispersions of clays are described by H. D. Foster, "Manufacture of Lightweight Products", *Bull. Am. Ceram. Soc.*, 19 (12) 468–73 (1940) and by C. M. Nicholson and G. A. Bole, "Cellulated Ceramics for the Structural Clay Products Industry" *Jour. Am. Ceram. Soc.*, 36 (4) 127–36 (1953). Known dispersion-foaming processes for clays employ organic polymeric or surface active foam stabilizers, such as cellulose ethers or esters, glues, gums, hydrolyzed vegetable and animal proteins, amines containing large hydrocarbon radicals, soluble salts of sulfonated hydrocarbons, and the like. Such foams have the serious disadvantage of loss of induced porosity and progressive shrinkage during drying and/or firing, resulting in inability to control density under commercial manufacturing conditions, and often inability to achieve practical densities lower than 40 to 50 PCF (pounds/cubic foot).

U.S. Pat. No. 3,737,332 issued June 5, 1973 describes the use of fatty amines to stabilize dispersion-foamed clays and achieve densities in the range of 1 to 12 PCF. However, one observes that the foamed clays thereby produced have relatively low strengths after firing, and are susceptible to severe cracking unless they are carefully dried over periods of at least several hours before firing. In addition to the relatively high drying shrinkages, the volume firing shrinkage of such foamed clays normally ranges from 35 to 45%, thus making it extremely difficult to control and reproduce density under practical commercial manufacturing conditions.

The present invention relates to novel foamed ceramics of the silica, alumina, and silica-alumina types, in which porosity is induced by foaming an aqueous dispersion of ceramic materials.

It is an object of this invention to provide lightweight ceramic compositions which are dimensionally stable at 1600°F. and higher, and which have exceptional strength and durability at densities below about 105 pounds per cubic feet.

It is a further object of this invention to provide cellular clay materials which have a uniquely uniform pore structure in which most of the void volume is provided by pores having effective diameters outside the range between about 2 microns and about 100 microns.

It is a further object of this invention to provide foamed kaolin shapes which have high green strength and exhibit low drying shrinkage.

It is a further object of this invention to provide lightweight foamed clay shapes which can be placed in a kiln while still moist and subjected to rapid firing conditions without destructive cracking or deformation.

It is a further object of this invention to provide foamed lightweight insluating firebrick which have a predominantly anorthite mineralogy and meet A.S.T.M. classification C155-70 for Groups 16 through 23.

An important object of this invention is to provide foamed clay compositions which fire to lightweight ceramic matrices without the evolution of noxious volatiles.

It is a further object of this invention to provide processes and techniques for the production of the novel foamed ceramic compositions described herein.

It is a further object of this invention to provide lightweight ceramic shapes suitable for use as building brick or blocks and as non-combustible core material for insulated panels, or for other structural or semi-structural applications such as exterior facings, wall and ceiling tile, curtain wall panels, panellized brick, partition walls, and the like.

Other objects and advantages of this invention will be apparent from the following detailed description thereof.

SUMMARY OF THE INVENTION

The foregoing and other objects of this invention are accomplished by production of foamed clay compositions by blending of a type formulation comprising:

| Constituent | Approximate Range of Parts By Weight per Hundred Parts of Dry Ingredients |
|---|---|
| Clay | about 20 to about 95 |
| Hydraulic cement | about 4 to about 35 |
| Inert particulate lamellar foam stabilizer | about 0.2 to about 30 |
| Water | about 21 to about 70 |
| Gas generating agent | sufficient to provide a final density of about 10 to about 105 PCF. |

The order of addition of the ingredients may be varied, and the preferred order depends mainly on the specific equipment used for mixing and the particular gas generating agent used. After the gas generating agent and the hydraulic cement have been incorporated, the blending is performed as rapidly as possible and the resulting dispersion is removed from the blending zone before an appreciable proportion of the gas has been generated. The dispersion is then discharged into a mold, or onto a conveyor or other next point of application. The mixture is then allowed to foam and set. With suitably chosen formulations foaming is essentially completed within a few minutes. The foamed clay compositions so produced exhibit good early green strength, and can be sufficiently hard in about 15 minutes or less to permit demolding and other handling operations. The green foamed clay articles can then be fired either with or without a prior drying step, so as to develop full ceramic maturity and achieve high strengths.

Suitable clays include kaolinite, illite, and montmorillonite types; fireclays, brick clays, flint clays, shale clays, slip clays, ball clays, kaolins, bentonites, and others. It should be noted that a natural clay may adventitiously contain a non-colloidal particulate lamellar material as defined below. Such a lamellar material may occur as an impurity in the clay, such as talc, mica, or pyrophyllite; or else the lamellar material may consist of a non-colloidal clay fraction such as delaminated kaolinite platelets with diameters greater than about 1 to 2 microns and diameter-to-thickness ratios greater than about 5:1. A clay which fortuitously naturally contains the appropriate minor fraction of such a lamellar material is found to perform the function both of the clay component and the lamellar material. The use of such a clay without the deliberate addition of a separate lamellar foam stabilizer is understood to be within the scope of the present invention.

If the desired end product is an insulating refractory it is preferred that the clay component be of relatively high purity, e.g., low in iron oxide or other reducible oxides, and low in organic and in alkali content. Suitable domestic clays for this purpose are kaolins found in Alabama, Florida, Georgia and South Carolina.

It is preferred that the clay component be at least partially deflocculable, since deflocculation reduces the quantity of water necessary to obtain a fluid dispersion and hence minimizes subsequent drying and/or firing shrinkages.

Part of the clay may be advantageously precalcined or employed as pulverized grog in order to further minimize shrinkages.

The clay content of the present formulations ranges between about 20 and 95 parts; unless otherwise noted the term "parts" as used in this specification denotes "parts by weight per hundred parts of dry insoluble ingredients". The precise amount of clay depends on the specific application and desired properties. For example, higher levels of clay generally result in higher firing shrinkages, but usually have an advantage in higher strengths for a given density, and lower cost.

The formulations of this invention include between about 4 and 35 parts of a hydraulic cement. This term is meant to include materials containing aluminates or silicates of alkaline earth elements or mixtures thereof, which compounds are hydratable to cementitious phases. Thus, calcium aluminates, calcium silicates, portland cements, slag cements, barium aluminates and others are included. Certain commercially available low iron calcium aluminates and white portland cement are particularly preferred for refractory clay foams wherein a low iron content is advantageous.

The setting rate and the green strength of the clay foam compositions both increase as the hydraulic cement content of the formulation increases. The preferred range of hydraulic cement is between about 5 and 20 parts.

An important feature of the present invention is the incorporation of an inert non-colloidal particulate lamellar foam stabilizer.

The average diameter of the lamellar particles is generally less than about 1 millimeter and the ratio of the average particle diameter to its average thickness is greater than about 5:1. Such lamellar foam stabilizers have been described in my U.S. Pat. Nos. 3,565,647 issued Feb. 23, 1971 and 3,729,328 issued Apr. 24, 1973. Examples of such lamellar materials are platey talc, mica, graphite, pulverized exfoliated vermiculite, pyrophyllite, and metal flakes such as flakes of aluminum, bronze and the like. The various lamellar materials differ in foam stabilizing efficiency. Quantities used in the present formulations vary between about 0.2 and 30 parts, depending mainly on the specific lamellar material used and the desired pore size of the foam. Higher levels of the lamellar foam stabilizer generally yield smaller pores. The lamellar foam stabilizers preferred in the present invention are talc, pyrophyllite and graphite. The preferred ranges are talc 3 to 15 parts; pyrophyllite 8 to 25 parts; and graphite 5 to 30 parts.

The gas generating agent employed in the production of the clay foam compositions is selected from any of a variety of chemical foaming systems known and used in the prior art. Such chemical foaming systems include hydrogen peroxide catalyzed by manganese dioxide, copper oxide or catalase; the combination of a carbonate such as calcium or magnesium carbonate, with an acid or acid salt such as sulfuric acid or aluminum sulfate, which react to generate carbon dioxide; the combination of a metal nitrite such as calcium nitrite, with an ammonium salt such as ammonium sulfate, which react to liberate nitrogen gas; and the like. Particles of aluminum or of zinc metal will also react to liberate gas in alkaline aqueous media, such as in the presence of portland cement, or alkali or quaternary ammonium hydroxides or silicates.

The preferred gas generating agent for foams intended for refractory use is the combination of hydrogen peroxide and a transitional metal oxide catalyst such as manganese dioxide. For clay foam building products the preferred gas generating agents are catalyzed hydrogen peroxide, and an acid-carbonate combination.

The total quantity of water employed in a specific formulation depends on the quantity and type of clay present, the quantity of hydraulic cement present, the type and quantity of foam stabilizers and non-plastic ceramic materials, the particle size distributions of the clay materials, whether deflocculants are employed, and the types and amounts of any other additives. The quantity of water is selected in a given formulation so as to obtain pourable fluidity but should not be so great as to destabilize the foam prior to setting, retard setting excessively, or yield foams of too low green strength or excessive shrinkage. For practical purposes the total quantity of water will be in the range of about 21 to 70 parts by weight per 100 parts by weight of the dry ingredients. The lower water levels are used in formulations containing coarser clays, appreciable amounts of non-plastic materials, or highly deflocculated clays. The higher amounts of water are used in formulations containing finer clays, swelling-type clays such as montmorillonites, or undeflocculated clays.

Other ceramic materials which do not interfere with the foaming reaction, or adversely affect the physical characteristics of the foamed clays, may be included in the formulations at levels up to about 76 parts. Such other materials may be incorporated for example in order to achieve a desired chemical or mineralogical composition after firing. Examples of such materials are aluminas including alpha aluminas, tabular aluminas, hydrous aluminas and high-surface-area aluminas; silicas; zircon; zirconia; limestone; dolomite; talc; olivine; pyprophyllite; kyanite; mullite; raw and calcined bauxite; feldspar; syenite; wollastonite; grog; trap rock; fly ash; particulate glass; metakaolinites; zeolites; and the like.

Reinforcing fibers may be added to enhance green or fired strength. For example, wood, cellulose, glass, asbestos, aluminosilicate and other organic or inorganic fibers can be incorporated in the formulations.

Water-soluble or water dispersible resins or polymers may also be used, particularly to enhance green strength. These include urea-formoldehyde, polyvinyl alcohol, methycellulose, polyacrylamide, polyoxythylene glycol, polyvinyl acetate, polyvinylpyrrolidone, starch, gelatin, and the like. Such resins or polymers are generally used at levels less than about 5 parts, because of their relatively high costs.

Deflocculants, dispersants, water reducers, and surface active agents may also be used to advantage, according to methods known in the art. Examples of such materials are sodium and potassium silicates, polyphosphates, lignosulfonates, amine oxides, alkali salts of fatty acids, alkali carbonates, and the like.

Also advantageous for certain purposes is the inclusion of accelerators or retarders. Such materials are well-known for calcium aluminates and portland cements, and function well in the present system. Examples of suitable accelerators are lithium salts, calcium sulfate hemihydrate, portland cement, hydrate calcium aluminate, and sodium carbonate, for calcium aluminate cements; and calcium chloride, triethanolamine, and calcium aluminate, for portland cements. Suitable retarders include citrates, sugars, hydroxylic carboxylic acids, borates, and phosphates, for both calcium aluminate and portland cements.

The foamed ceramic compositions of the present invention are all of the silica-alumina type and have a composition such that after firing they will contain the empirical equivalent of between about 20 to 85%, by weight, of alumina, and 15 to 95%, by weight, of silica; the total content of alumina and silica being at least about 65%, by weight.

The foamed clay products of this invention are characterized by a controllable, remarkably uniform pore structure as contrasted to known cellular foamed clays. The pores are generally isometric in shape and usually highly non-interconnected, with the major portion (i.e., greater than 50%) of the pore volume being due to pores of diameters outside the range between about 2 and 100 microns. The term "isometric" as used herein to refer to the shape of the pores is intended to mean equidimensional, i.e., the pores assume shapes which, while not necessarily spherical, are such that all diameters passing through the center are roughly the same length. It is believed that the novel and unique pore structure of the present invention accounts for the characteristic superior strength-to-density ratios, high abrasion resistance, and remarkable resistance of the present foamed clays to loss of porosity on drying and firing.

Moreover, relatively minor changes in formulation permit the practitioner of this invention to vary average pore size and to vary pore connectivity for each selected density, as desired to enhance certain final properties. For example in refractory insulation applications, pore diameters in the range 100 to 1000 microns are preferred in order to achieve the desirable low thermal conductivities at elevated temperatures while still maintaining good mechanical properties; by contrast, in foamed structural clay products the preferred pore diameters are in the range of about 1000 to 3000 microns and low pore connectivity is preferred. In the present invention pore diameters are readily and reproducibly varied by the type and amount of lamellar foam stabilizer as has already been described. Low pore connectivity is achieved by using dry formulation components of smaller particle size, preferably finer than about 60 standard U.S. mesh, and also by using smaller quantities of lamellar foam stabilizers so as to create larger pore diameters, which promote low connectivity.

The foams of the present invention generally have linear drying shrinkages less than 2 to 3%, and very often less than 1%. Also, linear firing shrinkages are generally similar to the firing shrinkages of the corresponding unfoamed formulations, so that the foams of the invention may be fired to full ceramic maturity without any appreciable loss of induced porosity. Suitable embodiments of the present invention yield controllable fired densities down to about 10 PCF (pounds/ft.$^3$). In addition foamed insulating firebrick of the present invention exhibit long term dimensional stability as determined by A.S.T.M. Test C113-68.

The invention will now be described in greater detail in conjunction with the following specific examples thereof.

DESCRIPTION OF THE PREFERRED EMBODIMENTS

Examples 1 to 6

A dry batch was prepared by thoroughly blending the dry ingredients in the proportions by weight given in Example 1 in Table I below using an 8-quart twin-shell Patterson-Kelly blender, and 3 kg of blender charge. The water mix was prepared by stirring the sodium silicate solution and then the hydrogen peroxide solution into the water in the proportions shown in Table I.

100 grams of the dry batch was thoroughly and uniformly blended into 38.3 grams of water mix, using a high shear laboratory stirrer. Total mixing time was 20 to 30 seconds. The dispersion, which had the flow characteristics of a deflocculated kaolin casting slip, was poured into an open mold 3 inches square, in area and 3 inches deep. The formulation foamed for about 8 minutes, and then hardened. About 1½ to 2 hours after casting, the foamed clay was hard enough to handle without breakage. The foam was demolded, and allowed to dry in air overnight. Air dried density was 21 pounds per cubic foot (PCF) and linear drying shrinkage less than 1%.

The dried foam was then fired by heating in an electric muffle furnace to 2350°F. over 3.5 hours, soaking at 2350±° 25°F. for 1 hour, and then allowed to cool down over about 6 hours.

Fired density was 27 PCF and linear firing shrinkage 14%. The foam decreased in weight a total of 19% between drying and firing.

In another experiment, a sample of green foam prepared as in Example 1 was fired on the same schedule; the firing was begun 2.5 hours after casting without any prior drying of the foam. There was no apparent difference in fired properties from those of the pre-dried fired foam.

The fired clay foam satisfied the requirements for Group 23 insulating firebrick, A.S.T.M. Classification C155-70. The pores were substantially spherical in shape, only partially interconnected, and extremely narrow in size distribution. Average pore diameter was about 1.3 millimeters (1300 microns). X-ray diffraction analysis indicated mullite and cristobalite were the crystalline phases present in the largest proportions. Cold crushing strength was 380 pounds per square inch (PSI) by A.S.T.M. test C93-67, as compared to 145 PSI for a commercial Group 23 insulating firebrick having a density of 32 PCF.

The formulations of Examples 2 through 6 were blended, foamed, dried and fired similar to the procedure used for Example 1. In each case the fired clay foams were white or off-white in color, extremely uniform in appearance and narrow in pore size distribution. Compressive strengths were high for the densities obtained.

Examples 4, 5 and 6 illustrate the replacement of raw clay by calcined clay to reduce firing shrinkage. Low firing shrinkage allows the production of relatively large unit dimensions on fast firing cycles, without excessive warpage or cracking.

The gas generating agent in each of the Examples 1 to 6 is hydrogen peroxide catalyzed by manganese dioxide ore. The lamellar foam stabilizer is platey talc. If the lamellar foam stabilizer is omitted from any of the formulations, the gas evolved by the gas generating agent is not retained by the dispersion, but escapes and the foam collapses.

TABLE I

| | EXAMPLE Parts by Weight | | | | | |
|---|---|---|---|---|---|---|
| | 1 | 2 | 3 | 4 | 5 | 6 |
| Kaolin, CW-L | 76.6 | 86.1 | 90.9 | 56.3 | 37.5 | — |
| Calcined Kaolin —35 M | — | — | — | 18.8 | 37.5 | 73.9 |
| Calcium aluminate, CA-25 | 19.1 | 9.6 | 4.8 | 18.8 | 18.9 | 18.5 |
| Platey talc | 3.8 | 3.8 | 3.8 | 5.6 | 5.6 | 7.4 |
| Manganese dioxide | 0.5 | 0.5 | 0.5 | 0.5 | 0.5 | 0.23 |
| Total dry batch: | 100.0 | 100.0 | 100.0 | 100.0 | 100.0 | 100.0 |
| Sodium silicate, Type N | — | — | 0.5 | 0.14 | 0.28 | — |
| 35% Aqueous hydrogen peroxide | 2.2 | 2.2 | 2.2 | 2.2 | 2.2 | 2.1 |
| Water | 36.1 | 36.1 | 35.6 | 30.6 | 30.4 | 25.6 |
| Total water mix: | 38.3 | 38.3 | 38.3 | 32.9 | 32.8 | 27.7 |
| Green Foam Properties | | | | | | |
| Air dry density, PCF | 21 | 23 | 23 | 23 | 25 | 24 |
| Drying shrinkage, linear % | <1% | <1% | <1% | <1% | <1% | <1% |
| Handling time, hr. | 2. | 3. | 5.5 | 3.5 | 8. | 16. |
| Fired Foam Properties | | | | | | |
| Average pore diameter microns | 1300 | 1300 | 1000 | 800 | 700 | 1500 |
| Density, PCF | 27 | 30 | 25 | 23 | 29 | 24 |
| Color | white | white | white | light grey | white | white |
| Firing shrinkage, linear % | 14 | 15 | 9.0 | 2.3 | 5.5 | 2.8 |

Examples 7 to 12

The formulations listed in Table II below were blended, foamed, and fired, by the procedure detailed for Example 1. In each case the fired clay foams were uniform in appearance; pore size distributions were narrow and average pore sizes ranged from 900 to 5000 microns. The fired foams all exhibited excellent dimensional stability at 2300°F. or above, and were white or off-white in appearance.

Examples 8 and 10 illustrate the use of different calcium aluminates, and Example 9, portland cement as the hydraulic cement component of the formulation. In Example 11 the lamellar foam stabilizer is graphite, and in Example 12, aluminum flake.

TABLE II

| | EXAMPLE Parts by Weight | | | | | |
|---|---|---|---|---|---|---|
| | 7 | 8 | 9 | 10 | 11 | 12 |
| Kaolin, CW-L | — | — | 18.8 | 18.8 | 18.8 | 19.8 |

TABLE II-continued

| EXAMPLE | | | | | Parts by Weight | |
|---|---|---|---|---|---|---|
| Calcined kaolin, −35 Mesh | — | — | 56.3 | 56.3 | 56.3 | 59.6 |
| Calcined kaolin, 40×140 Mesh | 51.2 | 51.2 | — | — | — | — |
| Calcium aluminate, CA-25 | 19.2 | 19.2 | — | — | 18.8 | 19.8 |
| Calcium aluminate, Refcon | — | — | — | 18.8 | — | — |
| Portland cement, white Type I | — | — | 18.8 | — | — | — |
| Alumina, Alcoa AL-325 Mesh | 25.6 | — | — | — | — | — |
| Alumina, Alcoa T61-48 Mesh | — | 25.6 | — | — | — | — |
| Platey talc | 3.8 | 3.8 | 5.6 | 5.6 | — | — |
| Graphite powder | — | — | — | — | 5.6 | — |
| Aluminum flake | — | — | — | — | — | 0.3 |
| Manganese dioxide | 0.24 | 0.24 | 0.5 | 0.5 | 0.5 | 0.5 |
| Total dry batch | 100.0 | 100.0 | 100.0 | 100.0 | 100.0 | 100.0 |
| Sodium Silicate, Type N | — | — | — | 0.14 | 0.14 | 0.15 |
| Borax | — | — | 0.10 | — | — | — |
| 35% Aqueous hydrogen peroxide | 2.2 | 2.2 | 2.2 | 2.2 | 2.2 | 2.2 |
| Water | 31.4 | 21.8 | 40.0 | 35.3 | 25.9 | 27.4 |
| Total water mix: | 33.6 | 24.0 | 42.3 | 37.6 | 28.2 | 29.8 |
| Fired Foam Properties | | | | | | |
| Average pore diameter, microns | 900 | 2000 | 1300 | 1500 | 5000 | 3000 |
| Density, PCF | 21 | 26 | 25 | 24 | 24 | 25 |
| Firing shrinkage, linear % | 4.2 | 1.5 | 4. | 5. | 1. | 3.8 |

Examples 13 to 18

The formulations 13 to 18 as listed in Table III below were blended, foamed and fired according to the procedure of Example 1. Examples 5, 13, 14 and 15 illustrate the effect of varying the level of lamellar foam stabilizer, in this case platey talc. The fired foams exhibited average pore diameters which changed approximately in inverse proportion to the amount of lamellar foam stabilizer, while the resulting density did not change significantly. There was also no appreciable change in firing shrinkage.

When dispersions of clays are foamed according to methods of the prior art, it is observed that attempts to reduce pore size, for example, by increased additions of surface active agents, invariably yield increased firing shrinkages, often to the point where it is not practical to fire such foams commercially. By contrast, the present foamed clays fire with shrinkages on the same order as unfoamed clay bodies of otherwise the same formulation.

Examples 16, 17 and 18 illustrate that fired foam density is readily controlled in the present invention by changing the level of gas generating agent, in this case catalyzed hydrogen peroxide. Densities of 15 PCF and even lower are readily achieved without engendering excessive firing shrinkage. Dispersion-foamed clays lighter than about 25 PCF have hitherto been impractical because of loss of porosity on firing, or excessive shrinkage which makes density too difficult to control commercially.

Example 19

| | Parts By Weight |
|---|---|
| Kaolin, Albion Cast 100 | 56.5 |
| Calcium aluminate, Refcon | 13.0 |
| Calcium carbonate, −100 mesh | 14.8 |
| Pyrophyllite, 200 mesh | 15.7 |
| Total dry batch | 100.0 |
| Sodium silicate, type N | 0.43 |
| Tetrasodium pyrophosphate | 0.04 |
| 35% Aqueous hydrogen peroxide | 1.6 |
| Water | 37.2 |
| Total water mix | 39.3 |
| 2.5% Aqueous MnSO$_4$·H$_2$O | 1.7 |

The dry batch ingredients were blended in the proportions by weight for Example 19, and a water mix was made by dissolving the sodium silicate, tetrosodium pyrophosphate, and 35% hydrogen peroxide in the water. A 2.5% aqueous solution of manganese II sulfate monohydrate was prepared separately. 1572 grams of water mix was preheated to 40°C., and then rapidly blended with 4000 grams of the dry batch using a 20-quart Hobart mixer. After about 45 seconds of mixing time 68 grams of the foaming catalyst solution, 2.5% MnSO$_4$·H$_2$O, was blended in. The dispersion was then cast into an open rectangular mold.

After 20 minutes, the clay dispersion had foamed and set sufficiently hard to be demolded. The foam was then fired, without prior drying, at 2400°F. over a total heating schedule of 6 hours, including a 2 hour soak at

TABLE III

| EXAMPLE | | | | | | Parts by Weight | |
|---|---|---|---|---|---|---|---|
| | 13 | 14 | 15 | 16 | 17 | 18 | 5 |
| Kaolin, CW-L | 36.2 | 38.3 | 39.0 | 37.5 | 37.5 | 36.2 | 37.5 |
| Calcined kaolin, −35 Mesh | 36.2 | 38.3 | 39.0 | 37.5 | 37.5 | 36.2 | 37.5 |
| Calcium aluminate, CA-25 | 18.2 | 19.1 | 19.5 | 18.9 | 18.9 | 18.2 | 18.9 |
| Platey talc | 9.1 | 3.8 | 2.0 | 5.6 | 5.6 | 9.1 | 5.6 |
| Manganese ore | 0.5 | 0.5 | 0.5 | 0.5 | 0.5 | 0.5 | 0.5 |
| Total dry batch | 100.0 | 100.0 | 100.0 | 100.0 | 100.0 | 100.0 | 100.0 |
| Sodium silicate, Type N | 0.27 | 0.29 | 0.29 | 0.28 | 0.28 | 0.27 | 0.28 |
| 35% Aqueous hydrogen peroxide | 2.1 | 2.2 | 2.2 | 1.1 | 3.8 | 3.6 | 2.2 |
| Water | 29.3 | 31.0 | 31.6 | 31.5 | 28.8 | 27.8 | 30.4 |
| Total water mix: | 31.7 | 33.5 | 34.1 | 32.9 | 32.9 | 31.7 | 32.8 |
| Fired Foam Properties | | | | | | | |
| Average pore diameter, microns | 500 | 1500 | 3000 | 500 | 1200 | 800 | 700 |
| Density, PCF | 29 | 27 | 26 | 39 | 15 | 15 | 29 |
| Firing shrinkage, linear % | 4.2 | 5.0 | 5.5 | 5.5 | 4.0 | 6.0 | 5.5 |

2400°F.

The fired foam was pale tan in appearance, and had an extremely uniform pore structure of average pore diameter 700 microns. Fired density was 28 PCF and linear firing shrinkage, 5.4%. X-ray diffraction analysis gave anorthite as the major mineralogical phase present. The empirical chemical composition was $Al_2O_3$ 38.2, $SiO_2$ 44.9, $TiO_2$ 1.3, CaO 14.5, MgO 0.2, $Fe_2O_3$ 0.7, ($Na_2O + K_2O$) 0.2, and MnO 0.02 weight percent. The fired foam satisfied the requirements for Group 23 insulating firebrick, A.S.T.M. Classification C155-70.

Examples 20 to 23

Foams formulated as given in Table IV below were made as follows. The dry batches were preblended, and the water-mix solutions were prepared separately. The dry batch was blended with the water mix in the given proportions using a high shear mixer, and a total blending time of 30 to 45 seconds. The 35% hydrogen peroxide was then immediately dispersed in the slurry over a period of about 15 seconds using high shear mixing. The mixture was then immediately cast into a mold, and allowed to foam and then set.

The foam formulation numbers 20 to 23 may be fired at temperatures ranging from 2400° to 2800°F., depending on the degree of ceramic maturity desired, and the refractoriness of the specific formulation. Example 23 which contains 67.4% alumina after firing yields the most refractory foam. The fired foams exhibit excellent dimensional stability at temperatures above 2500°F., and are suitable for use as insulating firebrick at service temperatures above 2500°F. They contain either mullite or corundum as the crystalline phase present in the greatest proportion. The foams are much lower in density than commercially available refractory insulation intended for use above 2500°F.

Examples 24 to 27

Referring to Table V, in each of Examples 24 to 27 the clay slurries were prepared by blunging the clay and other insoluble solid ingredients in water containing the sodium silicate and sodium citrate, where used, until a uniform dispersion was obtained. Batch sizes corresponding to about 2.5 pounds of dry ingredients were used. In Examples 24 and 25, the clay was ground to minus 40 U.S. mesh size before blunging. The resulting slurries are stable and if desired may be stored under agitation for at least several days before foaming.

To prepare the clay foams, the calcium aluminate cement was rapidly and thoroughly dispersed into the slurry using a high shear mixer and mixing times of 15 to 20 seconds. In Example 26, the sodium hexafluosilicate ($Na_2SiF_6$) was dry-blended with the calcium aluminate cement before dispersion into the clay slurry.

Immediately after the cement was dispersed, the hydrogen peroxide was dispersed into the mixture for about 15 seconds under high shear, and the slurry was then cast into open-top molds, allowed to foam and set, demolded, cut to size, and fired at 2000° to 2100°F.

The fired foams have a uniform, substantially non-interconnected pore structure, and excellent strength-to-density ratios. These foams make attractive, insulating, and fire-resistive structural-clay building units especially useful for veneer brick, partition wall brick, panellized brick, face-brick, and common brick applications.

In commercial production, batch sizes up to several hundred pounds may be foamed at one time; or else blending and foaming may be accomplished continuously using high-shear mixing equipment such as is described in U.S. Pat. No. 3,729,328.

TABLE IV

| | EXAMPLE | | Parts By Weight | |
|---|---|---|---|---|
| | 20 | 21 | 22 | 23 |
| Kaolin casting clay | 73.0 | 28.7 | 59.0 | 28.7 |
| Calcined kaolin, −35 Mesh | — | 42.7 | — | — |
| Refcon calcium aluminate | — | — | 13.6 | — |
| CA −25 calcium aluminate | 13.4 | 14.2 | 0 | 14.2 |
| Kyanite, −48 Mesh | — | — | 13.6 | — |
| Calcined bauxite, −48 Mesh | — | — | — | 42.7 |
| Pyrophyllite, −200 Mesh | 13.4 | 14.2 | 13.6 | 14.2 |
| Manganese dioxide ore, −325 Mesh | 0.2 | 0.2 | 0.2 | 0.2 |
| Total dry batch | 100.0 | 100.0 | 100.0 | 100.0 |
| Type N sodium silicate | 0.45 | 0.47 | 0.45 | 0.47 |
| Organophosphoric acid surfactant | 0.0022 | 0.0022 | 0.0023 | 0.0024 |
| Water | 33.2 | 33.4 | 33.8 | 33.0 |
| Total water mix: | 33.7 | 34.9 | 34.3 | 33.5 |
| 35% Hydrogen peroxide | 1.5 | 1.6 | 1.5 | 1.6 |
| Typical Fired Foam Properties | | | | |
| Average pore diameter, microns | 1000 | 900 | 700 | 600 |
| Density, PCF | 33 | 28 | 32 | 27 |
| Firing shrinkage, linear % | 8.0 | 6.5 | 8.9 | 3.5 |
| Chemical Analysis, weight % | | | | |
| $Al_2O_3$ | 47.4 | 47.4 | 45.7 | 67.4 |
| $SiO_2$ | 47.8 | 47.8 | 46.9 | 27.1 |
| $TiO_2$ | 1.3 | 1.3 | 1.4 | 1.8 |
| CaO | 2.7 | 2.7 | 5.0 | 2.7 |
| MgO | 0.1 | 0.1 | — | 0.1 |
| $Fe_2O_3$ | 0.6 | 0.6 | 0.8 | 1.0 |
| $Na_2O + K_2O$ | 0.2 | 0.2 | 0.2 | 0.2 |
| MnO | 0.1 | 0.1 | 0.1 | 0.1 |

TABLE V

| | EXAMPLES | | Parts By Weight | |
|---|---|---|---|---|
| | 24 | 25 | 26 | 27 |
| Shale-type brick clay | 89.5 | 89.5 | — | — |
| Fine-grained brick clay | — | — | 44.8 | — |
| Ball clay | — | — | — | 56.9 |

TABLE V-continued

| EXAMPLES | | | Parts By Weight | |
|---|---|---|---|---|
| Silica flour, –120 Mesh | — | — | — | 28.4 |
| Fly ash | — | — | 44.7 | — |
| Platey talc | 5.0 | 5.0 | 5.0 | 4.7 |
| Manganese dioxide ore, –325 Mesh | 0.5 | 0.5 | 0.5 | 0.5 |
| Type N sodium silicate | 0.75 | 0.75 | — | 0.71 |
| Sodium citrate | — | 0.025 | — | — |
| Water | 30.0 | 27.5 | 55.0 | 37.9 |
| Total clay slurry | 125.8 | 123.4 | 150.0 | 129.1 |
| Lumnite calcium aluminate | 5.0 | 5.0 | 5.0 | — |
| Refcon calcium aluminate | — | — | — | 9.5 |
| Sodium hexafluosilicate | — | — | 0.25 | — |
| Total cement | 5.0 | 5.0 | 5.25 | 9.5 |
| 35% hydrogen peroxide | 0.75 | 0.75 | 0.75 | 0.75 |
| Typical firing temperature, °F. | 2000 | 2000 | 2000 | 2100 |
| Fired Foam Properties | | | | |
| Average pore size, microns | 700 | 700 | 500 | 150 |
| Density | 68 | 66 | 55 | 66 |
| Color | brick-red | brick-red | brick-red | cream |

Examples 28 to 32

Referring to Table VI, formulations 28 to 32 were blended and foamed by the procedure described for Example 1. The foams were fired at the temperatures shown in the Table.

Examples 28 and 29 illustrate the control of pore structure in the present invention by variation of the level of the lamellar foam stabilizer, in this case talc, without having large changes in density. These foams are intended for structural or semi-structural building units, and in this case the larger average pore sizes are preferred. Such larger average pore sizes tend to reduce the water absorption, and thus enhance the durability of the fired foams under cyclic freezing and thawing conditions.

Examples 30 to 32 illustrate the use of low-iron clays and other materials in order to achieve light- or white-firing foams for esthetic architectural applications.

TABLE VI

| EXAMPLES | | | Parts By Weight | | |
|---|---|---|---|---|---|
| | 28 | 29 | 30 | 31 | 32 |
| Shale-type brick clay | 83.8 | 89.5 | — | — | — |
| Georgia kaolin | — | — | 39.8 | 59.6 | 59.6 |
| Silica flour, –120 Mesh | — | — | 39.7 | 19.9 | 19.9 |
| Platey talc | 10.5 | 5.0 | 10.0 | 10.0 | — |
| Pyrophyllite, –140 Mesh | — | — | — | — | 10.0 |
| Manganese dioxide ore, –325 Mesh | 0.5 | 0.5 | 0.5 | 0.5 | 0.5 |
| Lumnite calcium aluminate | 5.2 | 5.0 | 10.0 | 10.0 | — |
| Refcon calcium aluminate | — | — | — | — | 10.0 |
| Total dry batch | 100.0 | 100.0 | 100.0 | 100.0 | 100.0 |
| Type N sodium silicate | 1.1 | 0.5 | 0.5 | 0.75 | 0.75 |
| Water | 41.2 | 34.8 | 29.9 | 34.8 | 29.9 |
| Total water mix: | 42.3 | 35.3 | 30.4 | 35.6 | 30.7 |
| 35% Hydrogen peroxide | 0.79 | 0.75 | 0.50 | 0.50 | 0.75 |
| Typical firing temperature, °F. | 1950 | 2000 | 2250 | 2250 | 2100 |
| Fired Foam Properties | | | | | |
| Average pore size, microns | 450 | 100 | 250 | 250 | 1100 |
| Density PCF | 59 | 63 | 50 | 54 | 43 |
| Color | brick-red | brick-red | tan | tan | white |

Examples 33 and 34

Referring to Table VII, Example 33 illustrates the use of the combination of aluminum powder and sodium hydroxide as the gas generating agent of the present invention in a formulation for a high temperature insulation firebrick. Example 34 illustrates the combination of calcium carbonate and aluminum sulfate as the gas generating agent. These formulations were blended, foamed, and fired according to the method of Example 1, at 2400° and 2000°F., respectively.

| | Parts By Weight | |
|---|---|---|
| | 33 | 34 |
| Georgia kaolin | 18.9 | — |
| Calcined kaolin, –35 Mesh | 56.5 | — |
| Fine-grained brick clay | — | 88.2 |
| Platey talc | 5.6 | 4.9 |
| Aluminum powder | 0.2 | — |
| Precipitated calcium carbonate | — | 2.0 |
| CA-25 Calcium aluminate | 18.8 | — |
| Lumnite Calcium aluminate | — | 4.9 |
| Total dry batch: | 100.0 | 100.0 |
| Sodium hydroxide | 0.5 | — |
| Aluminum sulfate | — | 1.5 |
| Water | 41.9 | 63.7 |
| Total water mix: | 42.4 | 65.2 |
| Firing temperature, °F. | 2400 | 2000 |
| Fired Foam Properties | | |
| Average pore size, microns | 1500 | 1200 |
| Density, PCF | 32 | 72 |

While the invention has been described above in conjunction with certain preferred embodiments thereof, it is to be understood that these are merely illustrative of others which will now readily occur to those skilled in the art and that the scope of the invention is limited only by the prior art and the appended

What is claimed is:

1. A fired clay product composed of a rigid cellular mass having a bulk density in the range from about 10 to about 105 PCF obtained by mixing, foaming and firing a composition comprising about 20 to about 95 parts of clay, about 4 to about 35 parts of hydraulic cement, about 0.2 to about 30 parts of inert particulate lamellar foam stabilizer, from 0 up to about 76 parts of inert solid material, about 21 to about 70 parts of water, and a gas generating agent, said parts being by weight of the dry ingredients, all of the foaming action having occurred between cessation of said mixing and about 10 minutes thereafter.

2. A fired clay product according to claim 1 wherein at least part of the inert particulate lamellar foam stabilizer is present adventitiously in said clay.

3. A fired clay product according to claim 1 containing fiber.

4. A refractory foamed ceramic composition according to claim 1 characterized by dimensional stability at a maximum temperature in the range from about 2000° to about 2550°F., a bulk density of about 15 to about 45 PCF, pores substantially isometric in shape, and a predominate crystalline phase of anorthite.

5. A refractory foamed ceramic compostion according to claim 1 characterized by stability at a maximum temperature in the range from about 2300° to about 3200°F., pores substantially isometric in shape, and a predominate crystalline phase of mullite.

6. A refractory foamed ceramic composition according to claim 1 characterized by stability at a maximum temperature in the range from about 2300° to about 3200°F., pores substantially isometric in shape, and a predominate crystalline phase of corundum.

7. A composition to be foamed comprising about 20 to about 95 parts of clay, about 4 to about 35 parts of hydraulic cement, about 0.2 to about 30 parts of inert particulate lamellar foam stabilizer, from 0 up to about 76 parts of inert solid material, and a gas generating agent, said parts being by weight per 100 parts of the dry ingredients.

8. A composition according to claim 7 wherein at least part of the inert particulate lamellar foam stabilizer occurs adventitiously in said clay.

9. A composition according to claim 7 containing fiber.

10. A foamed clay composition obtained by mixing and foaming a composition comprising about 20 to about 95 parts of clay, about 4 to about 35 parts of hydraulic cement, about 0.2 about 30 parts of inert particulate lamellar foam stabilizer, from 0 up to about 76 parts of inert solid material, about 21 to about 70 parts of water, and a gas generating agent, said parts being by weight of the dry ingredients, and all of the foaming action having occurred between cessation of said mixing and about 10 minutes thereafter.

11. A composition according to claim 10 wherein at least part of the inert particulate lamellar foam stabilizer is present adventitiously in said clay.

12. A composition according to claim 10 containing fiber.

* * * * *